United States Patent
Isaacks et al.

(10) Patent No.: US 9,270,098 B2
(45) Date of Patent: Feb. 23, 2016

(54) SERVICE CABLE BOX

(71) Applicant: DIRTT Environmental Solutions, Ltd., Calgary (CA)

(72) Inventors: Scott J. Isaacks, Seattle, WA (US); Sean C. McCloud, Bothell, WA (US); Joshua Ray Knott, Burlington, WA (US)

(73) Assignee: DIRTT Environmental Solutions, LTD, Calgary (CA)

( * ) Notice: Subject to any disclaimer, the term of this patent is extended or adjusted under 35 U.S.C. 154(b) by 0 days.

(21) Appl. No.: 14/125,264

(22) PCT Filed: Nov. 19, 2012

(86) PCT No.: PCT/US2012/065920
§ 371 (c)(1),
(2) Date: Dec. 10, 2013

(87) PCT Pub. No.: WO2013/089979
PCT Pub. Date: Jun. 20, 2013

(65) Prior Publication Data

US 2014/0290975 A1    Oct. 2, 2014

Related U.S. Application Data

(60) Provisional application No. 61/570,714, filed on Dec. 14, 2011.

(51) Int. Cl.
*H02G 3/08* (2006.01)
*H02G 3/14* (2006.01)
(Continued)

(52) U.S. Cl.
CPC ............... *H02G 3/08* (2013.01); *H02G 3/086* (2013.01); *H02G 3/14* (2013.01); *H02G 3/18* (2013.01); *H01R 13/6397* (2013.01)

(58) Field of Classification Search
CPC ...... H01H 9/0264; G06F 1/181; H02G 3/185; H02G 3/388; G02B 6/4446; G02B 6/4447
USPC ........................ 174/50–50.52, 50.54, 58, 486, 174/487–489, 480–483, 502, 559, 560, 174/520; 220/3.2, 3.3, 4.02, 3.7; 312/292; 385/135; 361/724–727
See application file for complete search history.

(56) References Cited

U.S. PATENT DOCUMENTS

D260,878 S    9/1981  Dolinar
4,381,063 A   4/1983  Leong
(Continued)

FOREIGN PATENT DOCUMENTS

CA    2375554    9/2003
CA    2077362    5/2006
(Continued)

OTHER PUBLICATIONS

Canadian Office Action for PCT No. US2012033378 dated Dec. 2, 2014.
(Continued)

*Primary Examiner* — Angel R Estrada
*Assistant Examiner* — Dimary Lopez Cruz
(74) *Attorney, Agent, or Firm* — Workman Nydegger

(57) ABSTRACT

Cables boxes and cable distribution systems securely store and route network cables of different types and/or security classifications. More specifically, a service cable box can include one or more chambers that can secure secondary network cables of one or more types and/or classifications. The service cable box can have secure and unsecure connection chambers. Accordingly, the service cable box can segregate network connections of different types and/or security classifications and can selectively provide secured access thereto.

25 Claims, 8 Drawing Sheets

(51) Int. Cl.
*H02G 3/18* (2006.01)
*H01R 13/639* (2006.01)

(56) References Cited

U.S. PATENT DOCUMENTS

| | | | |
|---|---|---|---|
| 4,596,095 A | | 6/1986 | Chalfant |
| 4,640,564 A | * | 2/1987 | Hill ............................. 439/137 |
| 4,721,476 A | | 1/1988 | Zeliff |
| 4,729,614 A | * | 3/1988 | Nadler et al. ................. 312/292 |
| 4,778,399 A | * | 10/1988 | Schenk ......................... 439/147 |
| 4,850,014 A | * | 7/1989 | Gillis et al. .............. 379/413.02 |
| 5,052,157 A | | 10/1991 | Ducroux |
| 5,057,647 A | | 10/1991 | Bogden |
| D324,207 S | | 2/1992 | Nieves |
| 5,272,297 A | | 12/1993 | Reichow |
| 5,285,009 A | | 2/1994 | Bowman |
| 5,350,884 A | | 9/1994 | Littrell |
| D354,736 S | | 1/1995 | Hallett |
| D366,247 S | | 1/1996 | Mazura |
| D367,859 S | | 3/1996 | Beaumont |
| 5,575,668 A | | 11/1996 | Timmerman |
| 5,749,188 A | | 5/1998 | Belbenoit |
| 5,796,037 A | * | 8/1998 | Young et al. .................... 174/50 |
| 5,907,127 A | | 5/1999 | Daoud |
| 5,933,563 A | | 8/1999 | Schaffer |
| 5,945,633 A | | 8/1999 | Ott |
| D422,265 S | | 4/2000 | Noble |
| 6,102,229 A | * | 8/2000 | Moncourtois ................. 220/3.3 |
| 6,103,973 A | | 8/2000 | Sharp |
| D437,586 S | | 2/2001 | Sonntag |
| D450,666 S | | 11/2001 | Scribner |
| D463,775 S | | 10/2002 | Byrne |
| 6,467,640 B1 | | 10/2002 | Hung |
| 6,467,859 B2 | * | 10/2002 | Branz et al. ................... 312/292 |
| D472,213 S | | 3/2003 | Byrne |
| 6,603,660 B1 | | 8/2003 | Ehn |
| 6,621,975 B2 | | 9/2003 | Laporte |
| 6,796,437 B2 | | 9/2004 | Krampotich |
| 6,812,836 B2 | | 11/2004 | Soloway |
| 6,974,348 B2 | | 12/2005 | Bentley |
| D516,513 S | | 3/2006 | Kissinger |
| 7,045,706 B1 | * | 5/2006 | Lincoln et al. ................ 174/482 |
| 7,121,853 B1 | | 10/2006 | Gast |
| 7,136,278 B2 | * | 11/2006 | Allen ............................ 361/647 |
| D539,762 S | | 4/2007 | Johnson |
| 7,270,562 B1 | | 9/2007 | Trout |
| D560,609 S | | 1/2008 | Rosenthal |
| 7,602,766 B2 | | 10/2009 | Shtivelman |
| 7,762,839 B2 | | 7/2010 | Chen |
| D626,069 S | | 10/2010 | Byrne |
| 7,875,799 B2 | | 1/2011 | Fransen |
| 8,153,910 B1 | | 4/2012 | Penczak |
| 2002/0195261 A1 | | 12/2002 | Harrison |
| 2003/0228121 A1 | | 12/2003 | Dwyer |
| 2004/0149550 A1 | | 8/2004 | Allen |
| 2005/0164535 A1 | | 7/2005 | Isaacks |
| 2005/0246982 A1 | | 11/2005 | MacMillan |
| 2006/0221622 A1 | | 10/2006 | Howell |
| 2006/0233355 A1 | | 10/2006 | Markiewicz |
| 2007/0077800 A1 | | 4/2007 | Isaacks |
| 2008/0057758 A1 | | 3/2008 | Walter |
| 2008/0131132 A1 | | 6/2008 | Solheid |
| 2008/0197129 A1 | | 8/2008 | Gosche |
| 2009/0205864 A1 | | 8/2009 | McCarthy |
| 2010/0037554 A1 | | 2/2010 | Oh |
| 2010/0051308 A1 | | 3/2010 | Hansen |
| 2010/0108346 A1 | | 5/2010 | Curtis |
| 2011/0181163 A1 | | 7/2011 | Han |
| 2012/0118602 A1 | * | 5/2012 | Remmert ........................ 174/53 |
| 2013/0291740 A1 | | 11/2013 | Seitz |

FOREIGN PATENT DOCUMENTS

| | | |
|---|---|---|
| CA | 2691307 | 8/2010 |
| GB | 2432979 | 6/2007 |
| JP | 2002118937 | 4/2002 |
| JP | 3334621 | 8/2002 |
| JP | 2005102429 | 4/2005 |
| KR | 20030013777 | 2/2003 |
| KR | 2020090001720 | 2/2009 |
| KR | 100969193 | 7/2010 |
| WO | 2004093278 | 10/2004 |

OTHER PUBLICATIONS

European Search Report for PCT/US2012/033378, Mailed Nov. 19, 2014.
European Search Report for PCT/US2012/038390, Mailed Sep. 18, 2014.
National Security Telecommunications and Information Systems Security Instruction (NSTISSI No. 7003). Dec. 13, 1996. "Protective Distribution Systems (PDS)." NSTISSI No. 7033. 13pp. See pp. 7-8 (Annex B) specifically.
SMED International, nd. "Stay on top of your technology." 28 pp.
International Search Report and Written Opinion for PCT/US2012/033378 mailed Oct. 30, 2012.
International Search Report and Written Opinion for PCT/US2012/065920 mailed Feb. 28, 2013.
International Search Report and Written Opinion for PCT/US2012/038390 mailed Dec. 18, 2012.
European Office Action for European Patent Application 12790341.7 dated Sep. 3, 2015.
Canadian Office Action for PCT No. US2012033378 dated Oct. 7, 2015.
European Search Report for EP 12857784 dated Oct. 8, 2015.

* cited by examiner

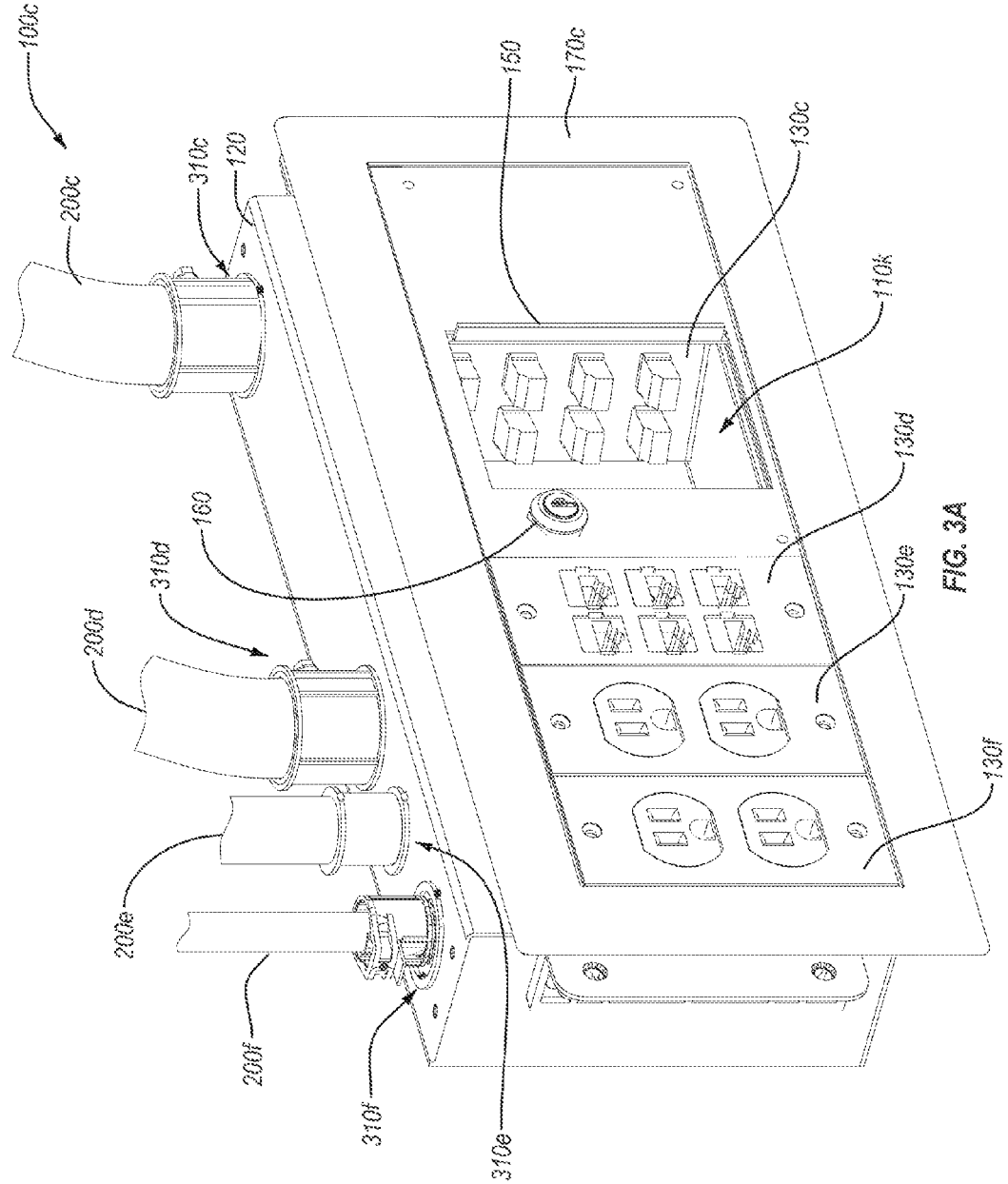

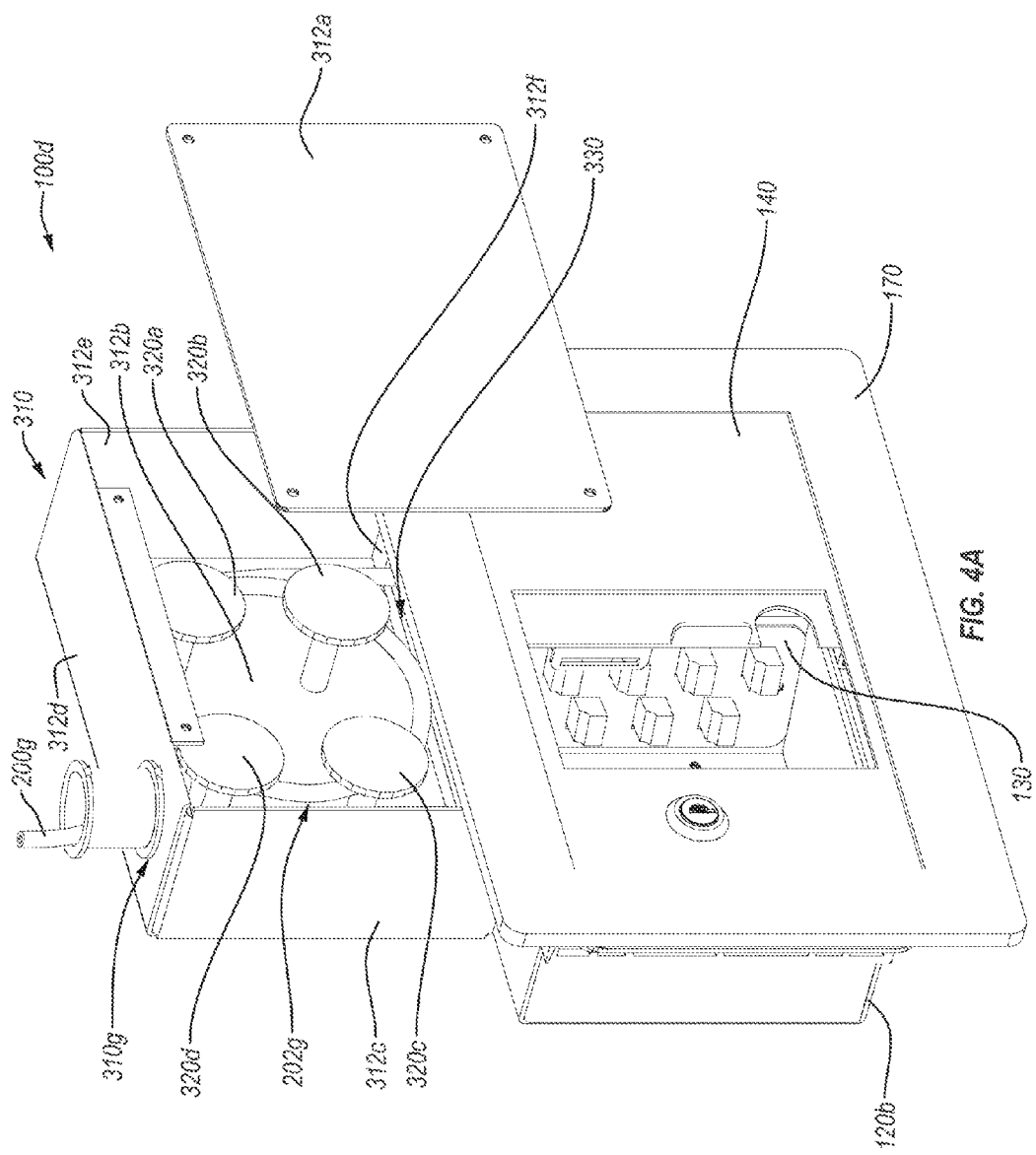

SERVICE CABLE BOX

CROSS-REFERENCE TO RELATED APPLICATIONS

The present invention is a 35 U.S.C. §371 U.S. National Stage of PCT Application No. PCT/US2012/065920 filed Nov. 19, 2012, entitled, "Service Cable Box," which claims the benefit of priority to U.S. Provisional Application No. 61/570,714, filed Dec. 14, 2011, entitled "Secure Wall Cable Box." The entire content of each of the aforementioned patent applications is incorporated herein by reference.

BACKGROUND OF THE INVENTION

1. The Field of the Invention

This invention relates to systems, methods, and apparatus for securing network cabling and/or network or electrical connections at a network endpoint.

2. Background and Relevant Art

Security concerns in data and communication infrastructures have increased in importance as more individuals, businesses, government, and military organizations increase reliance on data and communication networks. As an example, both government and military agencies often require physical security standards for sensitive information facilities, such as the DCID 6/9 and NSTISSI standards (both of these standards are herein incorporated by reference in their entirety). Providing secure cabling and cabling connections, is often an important part securing data and a network infrastructure.

Communication devices, such as computers, telephones, fax machines and other devices, often receive and transmit information through cables. For instance, fiber optic cables, copper cables, and other communication cables may carry information to and from the communication devices. Cable boxes are often connection points that organize the cables within a communication network. Many office buildings have at least one cable box, such as between the point at which a data cable enters a building and the point at which a data cable terminates at a communication device.

Cable boxes can include, for example, consolidation boxes and service cable boxes. An installer or a network architect can position the consolidation boxes in a ceiling, floor, or inside a wall. Consolidation boxes can provide network access and service to many different end users. Cable bundles, also known as "trunk lines" and "primary cables," can contain many individual cable strands. Cable bundles may enter into the consolidation box and can separate into smaller bundles or individual cables and proceed to several different service cable boxes. Smaller bundles or individual cables are also known as "branch lines" and "secondary network cables."

Unlike most consolidation boxes, service cable boxes may service a single end user or a small number of end users. Secondary network cables from a consolidation box may enter a service cable box through a designated entry port and connect to a connector module. Connector modules can connect to the ends of the secondary network cables. The connector modules may contain one or more connectors, such as network ports. A service network cable connected directly to a communication device can have a cable plug on an open end, which can couple to the connector on the connector module.

Typically, in order to maintain security, conventional cable boxes (including both consolidation boxes and service boxes) have a capability to accept only one type of classified network. Thus, a facility with several different classified networks may need separate cable boxes for each classified network. In such situations, the network architect can install multiple cable boxes in order to maintain security. Depending on the design of a particular facility, accommodating separate cable boxes for each network can be difficult or impossible.

Furthermore, conventional network systems often include both power/electrical cables and data cables. Unfortunately, including both data boxes and power or electrical boxes may increase installation and maintenance costs. Additionally, multiple different types of boxes can limit the availability of interior space for accommodating other components.

Accordingly, there are a number of disadvantages with conventional service cable boxes that can be addressed.

BRIEF SUMMARY OF THE INVENTION

Implementations of the present invention overcome one or more of the foregoing or other problems in the art with systems and apparatus for securing and routing cables. In particular, one or more systems and apparatus provided herein include a service cable box that securely houses and allows efficient routing of cables. For instance, in one or more implementations the service cable box can include one or more chambers that organize, route, and secure cables. Additionally, the service cable box can include one or more securable doors, which can restrict access to the cables, for example, based on a user's clearance.

For example, an implementation of a service box includes a housing, a first connection chamber located within the housing, and a second connection chamber located within the housing. The service box further includes a connector module separating the first connection chamber from the first second connection chamber. The service box also includes a barrier plate coupled to the housing. The barrier plate has an opening. The barrier plate is sized and configured to at least partially cover the first connection chamber and to prevent access thereto. Additionally, the service box includes a door coupled to one or more of the housing and the barrier plate. The door is configured to slide open and selectively provide access to the second connection chamber through the opening in the front barrier plate. The service box also includes a lock configured to selectively lock the door relative to the barrier plate.

Another implementation of a service cable box includes a housing configured to be mounted within a wall. A connection chamber is disposed within the housing. The connection chamber is configured to physically secure secondary network cables. A front barrier plate is coupled to the housing. The front barrier plate includes at least one opening configured to provide access to the connection chamber. The front barrier plate is configured to extend substantially parallel to the wall. The service cable box further includes a connector module located in the connection chamber. One or more of the front barrier plate or a face plate is configured to abut the wall when the service cable box is installed in the wall. The connector module has a non-parallel orientation with respect to one or more of the front barrier plate or the face plate. Additionally, the connector module is configured to be recessed within the wall.

In addition to the foregoing, a network cable distribution system includes one or more data or communication secondary network cables, an electrical secondary network cable, and a service cable box. Each of the cables and the service cable box are mounted within an interior space of one or more of a ceiling, a floor, or a wall. The service cable box includes a plurality of connection chambers within a unitary housing. The plurality of connection chambers accept and secure the one or more data or communication secondary network cable and the electrical secondary network cable. The service cable box further includes one or more lockable doors that selectively seal one or more connection chambers of the plurality of connection chambers within the service cable box.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. For better understanding, the like elements have been designated by like reference numbers throughout the various accompanying figures. Understanding that these drawings depict only typical embodiments of the invention and are not therefore to be considered to be limiting of its scope, the invention will be described and explained with additional specificity and detail through the use of the accompanying drawings in which:

FIG. 3A illustrates a perspective view of still another service cable box in accordance with an implementation of the present invention;

FIG. 4A illustrates a partially exploded front perspective view of another service cable box in accordance with an implementation of the present invention.

DETAILED DESCRIPTION OF THE PREFERRED EMBODIMENTS

Figure 1A:
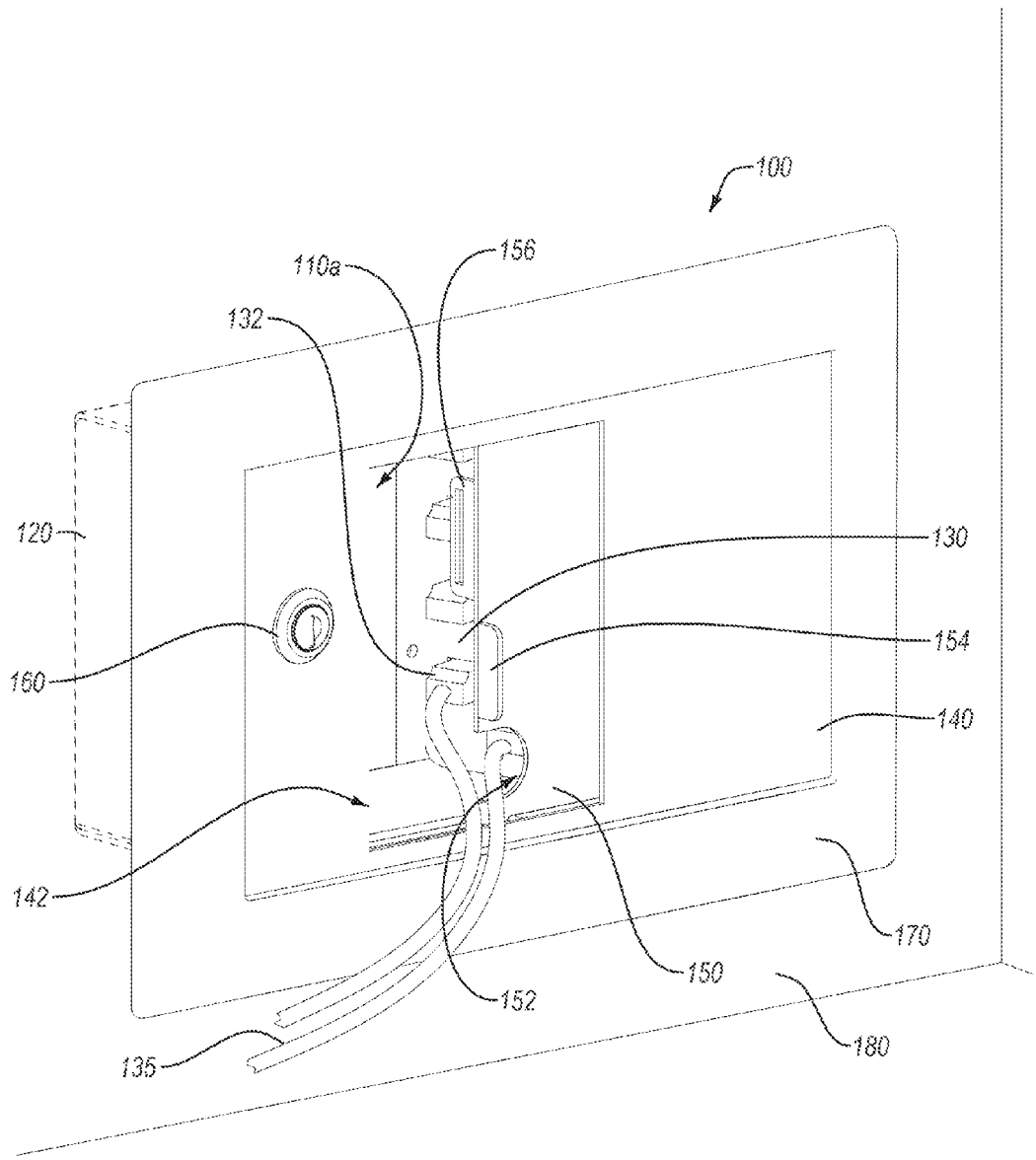
FIG. 1A illustrates a perspective view of a service cable box installed in a wall in accordance with an implementation of the present invention.

Implementations of the present invention include systems and apparatus for securing and routing cables. In particular, one or more systems and apparatus provided herein include a service cable box that securely houses and allows efficient routing of cables. For instance, in one or more implementations the service cable box can include one or more chambers that organize, route, and secure cables. Additionally, the service cable box can include one or more securable doors, which can restrict access to the cables, for example, based on a user's clearance.

More specifically, one or more implementations of a service cable box can secure certain network cables and/or connectors within secure connection chambers. The lockable doors can selectively close off the connection chambers. For example, a first lockable door may limit access for connecting to a network of a first security classification, while a second lockable door may limit access to connecting to a network having a second security classification. Furthermore, in one or more configurations, the service cable box also can include unsecure connection chambers, which can provide unlimited access (e.g., without a lockable door) to one or more networks.

Hence, in one or more implementations a service cable box can accept and secure network cable from networks having distinct security classifications (e.g., unclassified, sensitive, restricted, confidential, secret, top secret). In particular, the service cable box can segregate the secondary network cables of a first security classification from the secondary network cables of the second security classification. Moreover, the service cable box can limit access to the network cables and/or network connectors based at least in part on the security classifications of such network cables.

Consequently, as will be understood more fully in light of disclosure below, one or more implementations of the present invention provide one or more devices, systems, and/or components that make it possible to secure network cables with distinct security classifications within the same service cable box. As used herein, generally, a cable box can include any box, panel, outlet, or container that can serve as a point of connection, distribution, or junction within a data and communication network and/or electrical power infrastructure. Cable boxes can include both consolidation boxes that are configured to serve multiple end users and service boxes that are configured to serve a single or limited number of end users. In at least one implementation, the service cable box can receive and secure one or more cables from other cable boxes. As used herein, "cable" refers to any cable, wire, chord, or line that can be used as a communication or electrical transfer medium. For example, communications cables include Ethernet, fiber optic, electrical, cooper wire, telephone or any other communication or electrical cables of any form or standard.

In general, however, service cable boxes can accept and secure network cables from one or more portions of a power network, electrical network, communication/data network, and combinations thereof (hereinafter "networks"). As used herein, "network cables" refer to any cable, wire, cord, or line that can be used as a communication medium or electrical transfer medium for a network (e.g., a data network, a communication network, power network, electrical network etc.). Network cables include Ethernet, fiber optic, telephone, power, copper, or any other communication or cable in any form or standard.

The physical location of a service cable box can vary from one implementation to the next. For example, a network architect can provide a network architecture that positions the service box in an interior space between raised floors, suspended ceilings, or within walls. In one or more implementations, a network architect can cover the service box with a removable floor, ceiling or wall panel, which may hide the service cable box from plain view. In other implementations, the service cable box remains unconcealed (e.g., mounted in the floor, ceiling, or wall).

According to at least one implementation, the service cable box can protect and safely route service network cables out of one or more connection chambers. Particularly, when installed within the floor, ceiling, or wall, the service cable box can have a recessed connection chamber and a recessed connector module. The connector module can include multiple network connectors (e.g., data ports, electrical outlets, etc.). Furthermore, in one or more implementations the connector module can extend at approximately 90° with respect to the wall (or other mounting surface). Moreover, the connector module alternatively may have another non-parallel orientation with respect to the wall (i.e., form acute or obtuse angles), such that the service network cables connected to the network connectors exit in a non-perpendicular orientation to the wall.

In one or more implementations, a network architect can position the service cable box within a wall proximate to a communication device or an end user's workstation. The network architect can run individual cables from the service cable box (i.e., from the network connectors within the service cable box) directly to communication devices at the workstation. Thus, the service cable box can provide convenient and local access to the communications network connection for the communication device.

As described above, in one or more implementations the service cable box also can provide access to connectors from two or more networks of different types and/or security classification levels. For example, the installer can form a network system that incorporates multiple types and/or security classification networks routed to and/or distributed at a single endpoint (i.e., at the service cable box). Accordingly, the service cable box that can provide access (which may be restricted) to multiple network connectors of different types and/or security classifications. Such network connectors can accept service network cables that may connect individual devices, such as telephones, fax machines, computers, servers, etc., to corresponding networks.

For example, FIG. 1A illustrates a service cable box 100 can includes a service connection chamber 110a disposed within a housing 120. Within the service connection chamber 110a, the service cable box 100 can receive and secure secondary network cables. Such secondary network cables can connect to a connector module 130, which can connect such secondary network cables to one or more network connectors 132. The user can access the network connectors 132 in the service connection chamber 110a (which may be a secure or an unsecure connection chamber).

Particularly, the user can couple the service network cables 135 to the network connectors 132. Thus, within the service connection chamber 110a, the service cable box 100 can receive and secure one or more network service cables 135. As noted above, the network service cables 135 can connect various individual devices to the networks.

In one or more implementations, the service cable box 100 includes a front barrier plate 140, which can restrict access to the secondary network cables, the network connectors 132, and/or the connector module 130 located within the service cable box 100. The barrier plate 140 can couple to the housing 120, such that a portion of the barrier plate 140 can prevent access to the secondary network cables located within the service cable box 100. Particularly, the barrier plate 140 restricts access to at least one connection chamber (e.g., secondary connection chamber) that houses and/or secures the secondary network cables.

The barrier plate 140 also can facilitate access to the service connection chamber 110a and, consequently, to the connector module 130. For example, in at least one implementation, the barrier plate 140 includes an opening 142, which can provide access to the service connection chamber 110a. Additionally or alternatively, the barrier plate 140 can include multiple openings, one or more of which may allow the user to access at least a portion of the service connection chamber 110a.

As described above, the barrier plate 140 can cover and prevent access to at least one connection chamber. For example, the barrier plate 140 can form a permanent coupling with the housing 120. For instance, a manufacturer can rivet, weld, and/or screw the barrier plate 140 to the housing 120. In any event, housing 120 can fasten or couple to the barrier plate 140, such that the barrier plate 140 is immovable with respect to the housing 120. Accordingly, network cables located in the connection chambers covered by the barrier plate 140 may not be accessible to the users.

Hence, according to at least one implementation, the user can access the network connectors 132 through the opening 142 in the barrier plate 140. In some instances, however, access to the network connectors 132 may be restricted. Specifically, in the implementation illustrated in FIG. 1A, the service cable box 100 includes a door 150 (shown in a partially closed position). The door 150 can slide with respect to the barrier plate 140, thereby covering (when the door 150 is in the closed position) and uncovering (when the door 150 is in an open position) the opening 142. In particular, the user can slide the door 150 in one direction to uncover the opening 142 and provide to access the service connection chamber 110a. Conversely, the user can slide the door 150 in an opposite direction to cover the opening 142 and to block access to the service connection chamber 110a through the opening 142.

Thus, with the door 150 in the open position, the user can connect and/or disconnect service network cables 135 to/from the network connectors 132. After connecting and/or disconnecting the service network cables 135 to/from the network connectors 132, the user can slide the door 150 into the closed position, which may prevent unauthorized access to the service connection chamber 110a and, consequently, to the network connectors 132. The door 150 also may include a notch 152 that can facilitate the service network cables 135 exiting the service connection chamber 110a. The user also can utilize the notch 152 to slide the door 150 into the open position. In addition or alternatively to the notch 152, the door 150 also may include a tab 154 that the user can utilize to slide the door 150 into the open and/or closed positions.

Additionally or alternatively, in one or more other implementations, the service cable box 100 can include multiple doors (similar to the door 150). For instance, multiple doors may cover and uncover the opening 142, thereby blocking and allowing access, respectively, to the service connection chamber 110a. Furthermore, the door(s) 150 can have a hinged configuration, which may allow the user to swing the door 150 open and closed to respectively uncover and cover the opening 142. In yet at least one other implementation, the service cable box 100 may have no doors covering the opening 142 (i.e., for an unsecure service connection chamber 110a). Accordingly, the service cable box 100 may allow unrestricted access to the service connection chamber 110a and, consequently, to the networks connectors 132.

In the implementations where the service cable box 100 incorporates at least one door, such as the door 150, the service cable box 100 also can include a lock 160, which can secure the door 150 in the closed position. For instance, the door 150 can include a slotted tab 156, which can accept a locking element of the lock 160. More specifically, the slotted tab 156 can accept a hook that can secure or lock the door 150 with respect to the barrier plate 140 and/or housing 120, thereby preventing unauthorized users from accessing the service connection chamber 110a (and the connector module 130).

Furthermore, the type of lock 160 can vary from one implementation to the next. For example, the lock 160 can be a keyed lock that is opened with a key (not shown). Other locks lock 160 can include electromagnetic locks, electric locks, combination locks, touchpad locks, magnetic locks, or any other type of locking device that can securely lock the door 150 in the closed position.

As noted above, the service cable box 100 can accept secondary network cables from one or more networks. Moreover, such networks can have various security classifications, including security classifications that may require restricting access to such networks. Thus, in one or more implementations, the service cable box 100 provides restricted access to the service connection chamber 110a (and to the network connectors 132) and, therefore, to such networks. In other words, the service connection chamber 110a may be a secure connection chamber. The network administrator can provide authorized users with keys that can open the lock 160, and only the authorized users may be able to open the door 150 to access the service connection chamber 110a.

In one implementation, the service cable box 100 includes an alarm within the secured chamber (e.g., the service connection chamber 110a) to detect when the door 150 is opened. Such alarm can be dry contact buttons alarm, which detect opening of the door 150. In light of this disclosure, those of skill in the art will recognize that other electric and mechanical sensors can be used to activate an alarm in accordance with the present invention. With an alarm installed, authorized individuals that need to open the doors and access a secure chamber may need to schedule interruptions or deactivations of the alarm, before accessing the secure chamber. For example, the alarm may be deactivated using a password or code.

Triggering the alarm can elicit different responses. For example, the alarm can send a message to security personnel who can further investigate whether an authorized user is accessing the secured chamber. In another embodiment, an audible siren or flashing lights can be activated when the alarm is triggered.

The service cable box 100 also can include a face plate 170, which can conceal rough edges of an opening in the wall 180 (or other mounting surface). More specifically, the face plate 170 may be flush with the wall 180, such as to create an aesthetically pleasing appearance of the service cable box 100. Furthermore, in at least one implementation, the service cable box 100 is recessed within the wall 180. Particularly, the service cable box 100 can have the housing 120 and one or more connection chambers, such as the service connection chamber 110a recessed within the wall 180. Moreover, the connector module 130 also may be recessed within the wall 180.

In one or more implementations, as mentioned above, the connector module 130 can have a non-parallel orientation with respect to the wall 180. For example, as shown in FIG. 1A, the connector module 130 can have a substantially perpendicular orientation with respect to the wall 180. Alternatively, the connector module 130 can have other non-parallel orientations, such as forming acute or obtuse angles with respect to the wall 180.

In other words, the network connectors 132 can face in a direction that is not perpendicular to the surface of the wall 180 housing the service cable box 100. In any event, the service network cables 135 connected to the network connectors 132 can connect to the connector module 130 and/or exit the service connection chamber 110a at a non-perpendicular angle with respect to the wall 180, as shown by FIG. 1A. Such orientation of the connector module 130 within the wall 180 (where the connector module is so recessed and oriented) can allow the installer to run service network cables 135 substantially along the surface of the wall 180, without significant bending thereof.

Certain types of network cables, such as fiber optic cables, may not easily (or at all) bend beyond a minimal radius. Accordingly, the above-described configuration can allow the installer to run the fiber optic secondary network cables 135 along the wall 180, while maintaining the minimal radius. Furthermore, recessed and angled network connectors 132 can have greater protection from accidental impact from passersby and/or from equipment. More specifically, the network connectors 132 can remain protected within the service connection chamber 110a.

Additionally, angled connector modules 130 can provide ease of use, which includes a convenient viewing angle, connection angle, and the ability to easily label the connection panel. For instance, the service connection chamber 110a can include modular cassettes, jacks, and/or other connector modules 130 that are pre-fabricated, and which may have matching colors and/or keyed connectors to minimize installation time and connection errors.

Figure 1B:
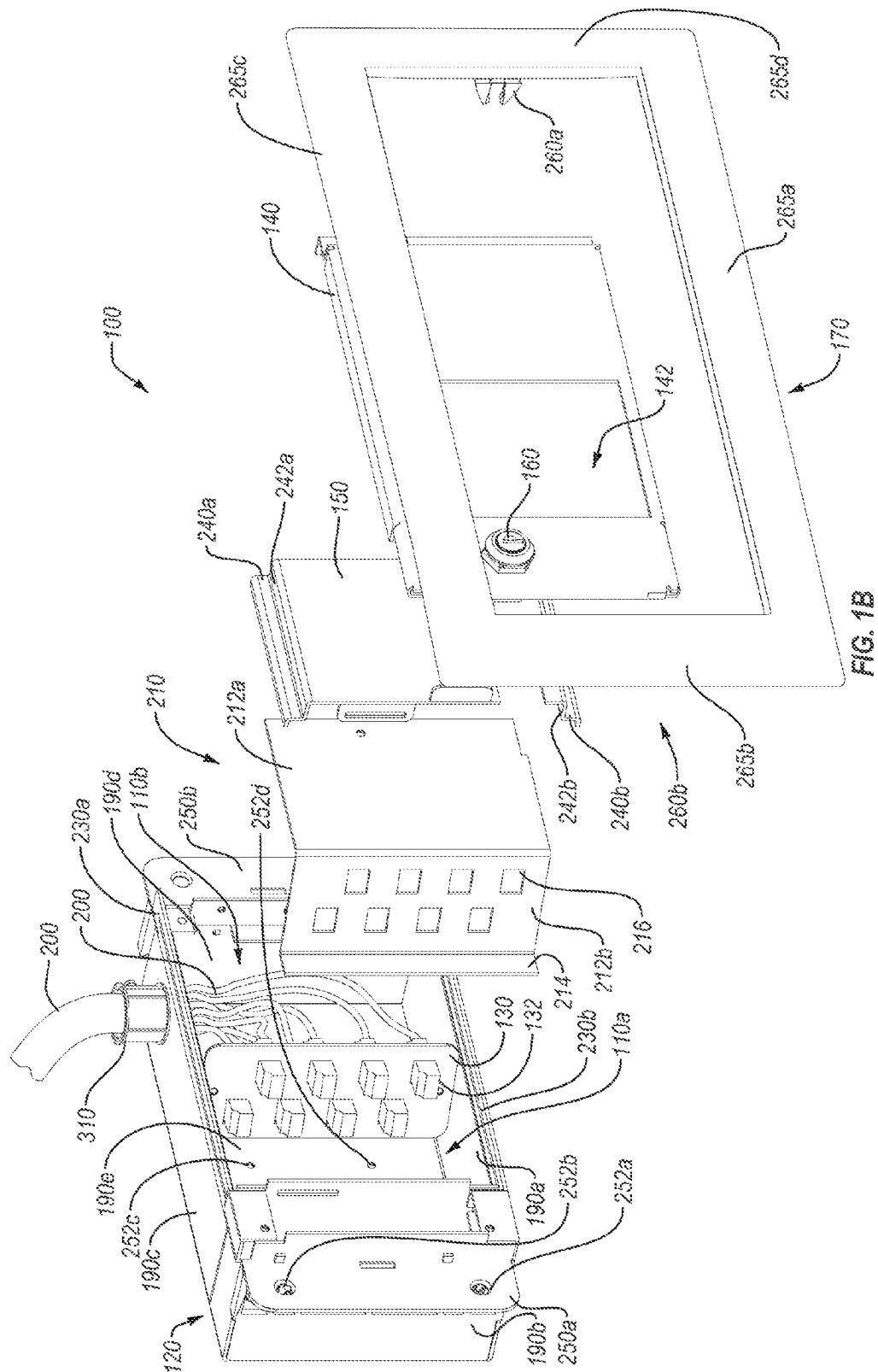
FIG. 1B illustrates an exploded perspective view of the service cable box of FIG. 1A.

Referring now to the FIG. 1B, which illustrates additional details of the service cable box 100. More specifically, the housing 120, which contains connection chambers, can have one or more sidewalls such as sidewalls 190a, 190b, 190c, 190d, and a back wall 190e, which define the housing 120. Additionally, such sidewalls 190a, 190b, 190c, 190d, and back wall 190e can be substantially flat, arcuate, or can have an irregular shape. The sidewalls 190a, 190b, 190c, 190d also can form various angles with respect to one another. Similarly, the sidewalls 190a, 190b, 190c, 190d can form various angles with respect to the back wall 190e.

For instance, sidewalls 190a and 190b can form a substantially 90° angle with respect to each other. Those skilled in the art, however, should appreciate that sidewalls 190a, 190b, 190c, 190d, and the back wall 190e can have different shapes and can form different angles with respect to one another. Accordingly, the housing 120 also can have various shapes. For instance, the housing 120 can have substantially rectangular shape. Alternatively, the housing 120 can have cylindrical or other shapes.

In one implementation, the housing 120 is made from a strong metal, such as stainless steel or other materials with similar properties. For instance, the housing 120 can comprise 16-gauge steel. Just as the general configuration of the housing 120 can vary, so too can the size of the housing 120. In one example implementation, the housing 120 has a length of about fourteen inches, a width of about three inches, and a height of about six inches. As can be understood, the size of the housing 120 can vary from one implementation to the next by varying the sizes of the sidewalls 190a, 190b, 190c, 190d, and the back wall 190e. Thus, depending on the number of connections required or the size of the network cables connecting to or within the service cable box 100, the housing 120 can have an appropriate size to accommodate such network cables. Therefore the length, width, height, and the combination thereof of the service cable box 100 can be larger or smaller than the above dimensions.

In any event, the housing 120 can include multiple connection chambers, such as the service connection chamber 110a. In at least one implementation, the housing 120 also includes a secondary connection chamber 110b. The secondary connection chamber 110b can accept and physically secure secondary network cables 200, which can enter the secondary connection chamber 110b through an entry port 310. Furthermore, as described above, the barrier plate 140 can at least partially restrict access to the secondary network cables 200 by restricting access to the one secondary connection chamber 110b.

In light of this disclosure, those skilled in the art should appreciate that the service connection chamber 110a and the secondary connection chamber 110b can have various shapes, sizes, and configurations. For example, the service connection chamber 110a and the secondary connection chamber 110b can be substantially the same size and/or shape, which may be a substantially rectangular shape. The service connection chamber 110a and/or secondary connection chamber 110b, however, can also have other configurations, which may in part depend on the sizes and shapes of the sidewalls 190a, 190b, 190c, 190d of the housing 120.

Additionally, a divider can separate a larger chamber into the service connection chamber 110a and the secondary connection chamber 110b. In particular, in one or more implementations, the connector module 130 divides a larger chamber and separates the service connection chamber 110a from the secondary connection chamber 110b. Accordingly, the sizes and/or shapes of the service connection chamber 110a and secondary connection chamber 110b may depend on the location as well as on the orientation of the connector module 130. For example, the connector module 130 may be oriented at a substantially 90° angle with respect to the back wall 190e, thereby forming substantially rectangular service connection chamber 110a and secondary connection chamber 110b (when the sidewalls 190a, 190b, 190c, 190d are positioned at 90° angles with respect to one another). Alternatively, the connector module 130 can form other angles (i.e., acute and obtuse angles) with respect to the back wall 190e.

Additionally or alternatively, the service cable box 100 can include a connection chamber shield, which can further protect connection chambers (located in the housing 120) from unauthorized access. For example, in at least one implementation the service cable box 100 includes a secondary connection chamber shield 210 that covers and protects the secondary connection chamber 110b. The shield 210 can include sidewalls 212a, 212b, and a mounting tab 214, which can couple the shield 210 to the housing 120. In addition to further protection from unauthorized access, the sidewalls 212a, 212b also can reduce and/or eliminate electromagnetic interference from network cables located in other (e.g., adjacent) connection chamber as well as network cables located outside of the service cable box 100. The shield 210 also can include one or more perforations 216, which can allow the secondary network cables 200 to pass through the sidewalls 212b and connect to the connector module 130.

Similarly, the housing 120 also can include an entry point, which can allow the secondary network cables 200 to pass into the secondary connection chamber 110b. For instance, the housing 120 can incorporate the entry port 310, which can include an opening that allows the secondary network cables 200 to pass into the housing 120 and into the secondary connection chamber 110b. Additionally, the entry port 310 can include a clamp, which can secure the secondary network cables 200 at the entry port 310, thereby preventing potential damage to the secondary network cables 200.

In light of this disclosure, those skilled in the art should appreciate that the service cable box 100 can incorporate multiple entry ports (e.g., similar to the entry port 310) which can allow secondary network cables 200 to pass into one or more secondary connection chambers. For example, the secondary connection chamber 110b can have two or more entry ports. Additionally or alternatively, the service cable box 100 can have multiple secondary connection chambers (similar to the secondary connection chamber 110b), each of which can include at least one entry port.

As described above, the service cable box 100 can include a door 150, which can allow and block access to the service connection chamber 110a. In other words, the door 150 can seal and unseal the service connection chamber 110a, thereby preventing or allowing access thereto. More specifically the door 150 can slide with respect to the barrier plate 140 thereby allowing access to the service connection chamber 110a through the opening 142. In one or more implementations, the housing 120 includes housing slots 230a, 230b that can accept corresponding portions of the door 150. For example the door 150 can include tabs 240a, 240b, which can fit into the corresponding housing slots 230a, 230b, thereby securing the door 150 to the housing 120.

The tabs 240a, 240b can have a substantially parallel orientation with a face of the door 150. Furthermore, the door 150 can include retaining tabs 242a, 242b connecting the tabs 240a, 240b to the door 150. The retaining tabs 242a, 242b can have a substantially perpendicular orientation with respect to the door 150. Furthermore, the retaining tabs 242a, 242b can support the door 150 on one or more sidewalls 190a, 190c and/or on one or more housing slots 230a, 230b. Accordingly, the door 150 can remain suspended with respect to the housing 120, by resting on the retaining tabs 242a, 242b.

As noted above, the housing 120, service connection chamber 110a, secondary connection chamber 110b, and/or connector module 130 can be recessed within the wall 180 (see FIG. 1A). In at least one implementation, the housing 120 includes two flanges 250a, 250b. The flanges 250a, 250b have various holes or perforations, such as holes 252a, 252b in the flange 250a. The installer can fasten the service cable box 100 to a portion of the wall (e.g., to a support beam or a stud), by fastening the flanges 250a, 250b to such portions of the wall.

As will be appreciated by those skilled in the art, similar to the housing 120, the flanges also can comprise steel, aluminum, plastic (e.g., reinforced plastic) or other suitable material. Furthermore, it should be appreciated that the housing 120 can incorporate more or fewer than two flanges (such as the flanges 250a, 250b). Moreover, the flanges that can secure the service cable box 100 to the wall can have various shapes and sizes.

In at least one other implementation, the service cable box 100 can have other portions that can couple or fasten to the wall or portions thereof. For instance, the back wall 190e of the housing 120 can have various holes or perforations that can accept fasteners to secure the service cable box 100 within the wall, such as holes 252c, 252d. It should be noted that the back wall 190e can have fewer or more than two holes in the back wall 190e, and such holes can accept various types and sizes of fasteners, which can secure the service cable box 100 within the wall.

As described above, in one implementation, the service cable box 100 also includes a face plate 170, which can cover and/or conceal the edges of the opening in the wall that accepts the service cable box 100. For example, the face plate 170 can have tabs 260a, 260b that can snap into corresponding openings in the housing 120 (and particularly in the flanges 250a, 250b), thereby securing the face plate 170 to the housing 120. The manufacturer may choose various suitable materials for the face plate 170, such as steel, aluminum, or plastic.

Moreover, face plate 170 also can have various shapes and contours. In the implementation illustrated in FIGS. 1A and 1B, the face plate 170 has a substantially rectangular shape and multiple beveled faces 265a, 265b, 265c, 265d. The face plate 170, however, can have other shapes and face contours (e.g., rounded face contours). Moreover, the shape and size can be sufficient to cover the edges of the opening in the wall; however, the shape and size of the face plate 170 can be different from the shape of the housing 120.

One skilled in the art should appreciate that, in one or more implementations, the service cable box 100 may have no face plate 170. Additionally or alternatively, in at least one other implementation, the service cable box 100 can include the barrier plate 140 that extends beyond the edges of the housing 120. Such barrier plate 140 can cover the edges of the opening in the wall (that accommodates the service cable box 100).

As described above, in one or more implementations, the barrier plate 140 is secured to the housing 120 in a non-movable manner, such that the user accessing the service connection chamber 110a cannot access the secondary connection chamber 110b. In alternative implementations, however, as illustrated FIG. 1C, a service cable box 100a includes a barrier plate 140a that can allow the user to access the secondary connection chamber 110b. For example, the barrier plate 140a can swing open, thereby exposing the secondary connection chamber 110b. Accordingly, the user can connect and/or disconnect secondary network cables within the secondary connection chamber 110b.

For instance, a hinge assembly 270 can rotatably couple the barrier plate 140a to the housing 120. The hinge assembly 270 can comprise a pin (or multiple pins) that fit through an opening at or near the edge of the barrier plate 140a. Alternatively, the hinge assembly 270 can incorporate additional elements, which have one or more openings for accepting the pins, and which connect to the barrier plate 140a. Moreover, openings that can accept pins may be located within the housing 120 and may accept pin-like protrusions extending from the barrier plate 140a. In yet one or more other implementations, both the housing 120 and the barrier plate 140a can have openings that accept a pin (or multiple pins), which form the hinge assembly 270 that secures the barrier plate 140a to the housing 120. In light of this disclosure, those skilled in the art should appreciate that the hinge assembly 270 can have other configurations that can secure the barrier plate 140a to the housing 120.

In some instances, the user may desire to access only the service connection chamber 110a, to connect and/or disconnect service network cables therein. Accordingly, similar to the service cable box 100 (see FIGS. 1A and 1B), the service cable box 100a also includes a door 150a. In particular, the door 150a can slide into an open and closed positions, thereby providing and blocking access to the service connection chamber 110a. For example, the door 150a can couple to the barrier plate 140a and can slide within the door slots 230c, 230d into an open and closed positions. Particularly, when the door 150a is in the open position, the user can access the service connection chamber 110a through an opening 142a in the barrier plate 140a.

As noted above, the service cable box 100a can secure secondary network cables and/or service network cables and can restrict access thereto as well as to the network connectors. Thus, in at least one implementation, the service cable box 100a includes a lockable barrier plate 140a. Accordingly the barrier plate 140a can swing into a closed position, where the lock 160 can secure the barrier plate 140a and prevent the barrier plate 140a from opening (i.e., from swinging into the open position).

For example, as mentioned above, the door 150a can couple to the barrier plate 140a and can slide within the door slots 230c, 230d. When the door 150a moves into the closed position, the door 150a can enter a locking slot 280, which can be secured to or incorporated into the housing 120. When the user moves the door 150a into the locking slot 280, the door 150a may lock the barrier plate 140a, securing the barrier plate 140a to the housing 120. In other words, the locking slot 280 will hold the door 150a, and the door 150a will hold the barrier plate 140a (through the door slots 230c, 230d).

In alternative implementations, however, the door 150a can couple to the housing 120 (such as within housing slots 230a, 230b described above in connection with FIGS. 1A and 1B). In such implementations, the barrier plate 140a can incorporate the locking slot (such as the locking slot 280). Hence, the door 150a can slide along the housing slots and into the locking slot located on or incorporated into the barrier plate 140a, thereby locking the barrier plate 140a to the housing 120.

For further security, the lock 160 can lock the door 150a. Particularly, when the user turns the lock 160, a hook 290 enters the slotted tab 156, thereby securing the door 150a in the closed position and preventing the door 150a from sliding within the door slots 230c, 230d. Hence, when the door 150a is in the closed position and locked by the lock 160, as mentioned above, the barrier plate 140a is also secured and locked to the housing 120 in the closed position.

In at least one implementation, substantially the entire door 150a can fit into the locking slot 280. Similarly, the entire door 150a can fit within the door slots 230c, 230d. Accordingly, the locking slot 280, the door slots 230c, 230c, and the door 150a can provide substantial resistance to opening the barrier plate 140a, when the door 150a is in the closed position. Thus, such configuration can improve temper resistance of the barrier plate 140a.

Figure 1C:
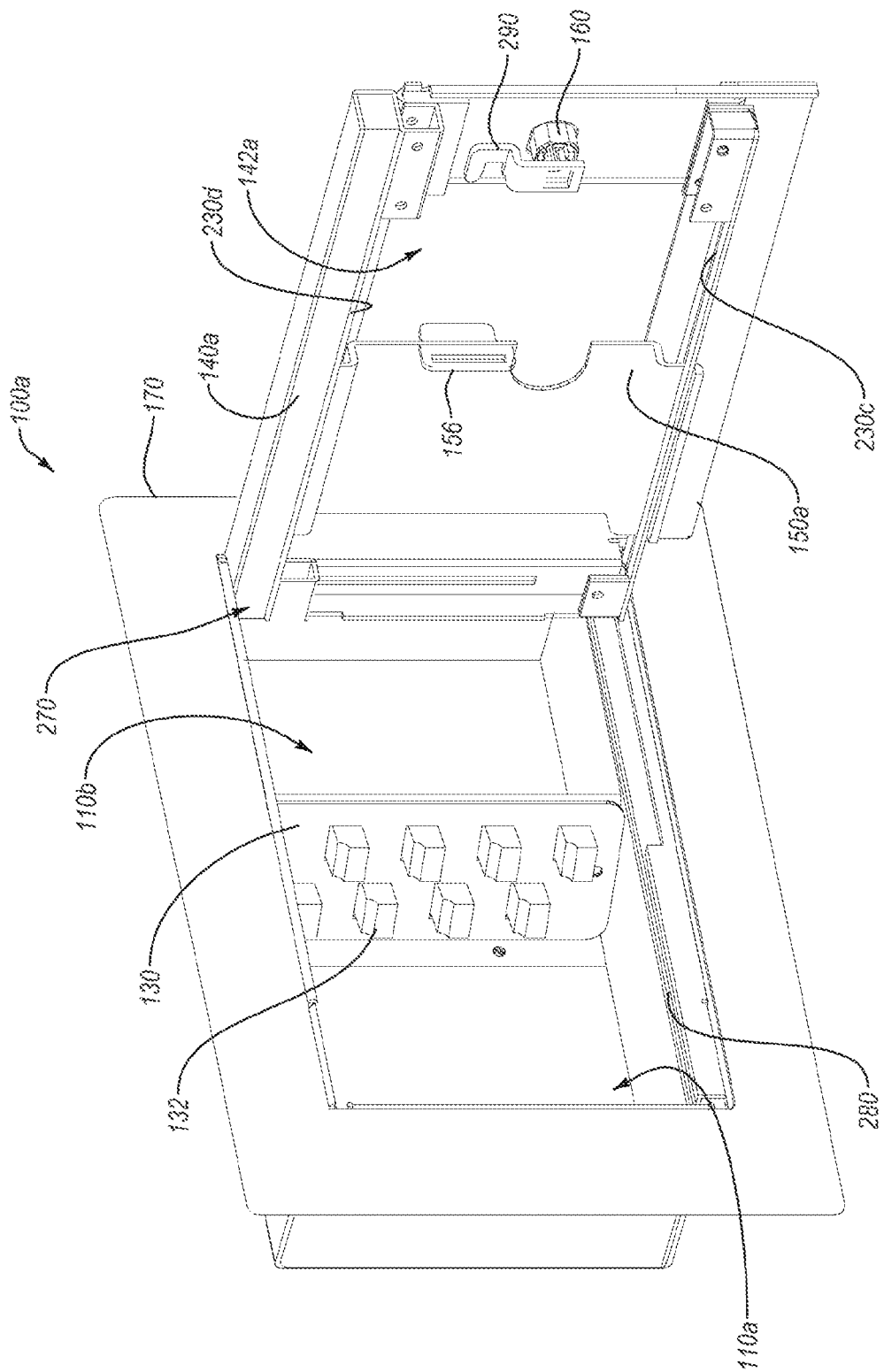
FIG. 1C illustrates a perspective view of another service cable box in accordance with an implementation of the present invention.
Figure 2:
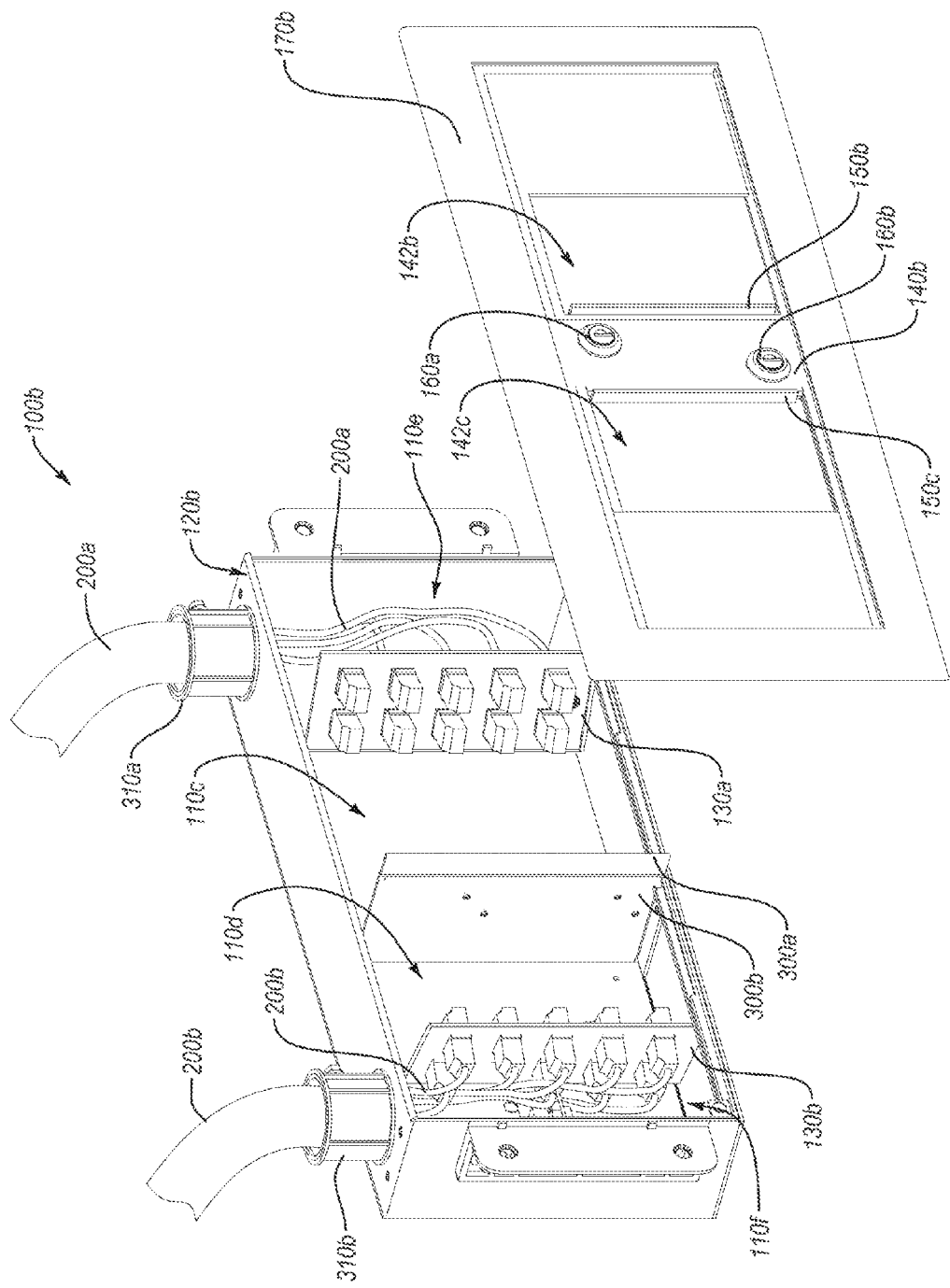
FIG. 2 illustrates a partially exploded perspective view of yet another service cable box in accordance with an implementation of the present invention.

The service cable box 100, 100a described in connection with FIGS. 1B and 1C has a single service connection chamber 110a and a single secondary connection chamber 110b. It is to be appreciated that this invention is not so limited. For example, as illustrated in FIG. 2, a service cable box 100b has multiple secondary connection chambers and multiple corresponding service connection chambers. In particular, the service cable box 100b includes a first service connection chamber 110c and a second service connection chamber 110d. The service cable box 100b also includes a first secondary connection chamber 110e and a second secondary connection chamber 110f.

The first and second service connection chambers 110c, 110d as well as the first and second secondary connection chambers 110e, 110f are located within a housing 120b. The housing 120b can have the shape and dimensions described above in connection with the housing 120 (FIGS. 1A-1B). Similarly, one or more sidewalls of the housing 120b can define and/or form the first and second service connection chambers 110c, 110d as well as the first and second secondary connection chambers 110e, 110.

Additionally, a connector module (similar to the connector module 130 described above (see FIG. 1B)) also can define (at least in part) one or more of the connection chambers. For example, a connector module 130a can define or separate the first service connection chamber 110c from the first secondary connection chamber 110e. Similarly, a connector module 130b can define or separate the second service connection chamber 110d from the second secondary connection chamber 110f.

In one or more implementations, the service cable box 100b has at least one barrier, such as a barrier 300a. The barrier 300a can in part define the first and/or second service connection chambers 110c, 110d. Moreover, the barrier 300a can prevent the user accessing one service connection chamber from accessing an adjacent connection chamber. For example, the barrier 300a can prevent the user accessing the first service connection chamber 110c from accessing the second service connection chamber 110d. In one implementation, the barriers 300a, 300b are made from a strong metal and are permanently attached to the housing 120 (e.g., welded to the housing).

Also, more than one barrier can separate the first service connection chamber 110c and the second service connection chamber 110d. For instance, the service cable box 100b can include a second barrier 300b, which can be adjacent to the barrier 300a. Furthermore, in at least one implementation, the barriers 300a, 300b include a space therebetween. Additional barriers can provide further separation between the service connection chambers, and can increase temper resistance of the service cable box 100b. In other words, multiple barriers can have a greater efficacy in preventing an unauthorized user from gaining access from one of the service connection chambers into the adjacent connection chamber.

As noted above, the service connection chambers (such as the first and the second service network connection chambers 110c, 110d) can accept service network cables that connect users' devices to the networks. Similarly, the first and second secondary connection chambers 110e, 110f can accept and secure secondary network cables (e.g., secondary network cables 200a, 200b). In at least one implementation, the secondary network cables 200a, 200b can connect distinct networks to the service cable box 100b. In other words, the secondary network cable 200a can connect a first network and the secondary network cable 200b can connect a second network to the service cable box 100b.

Additionally or alternatively, the secondary network cables 200a, 200b can connect distinct sets of networks, and each set of networks can have distinct characteristics or attributes. Such characteristics or attributes can include network classification, network type (e.g., data network, telephone network, electrical, network, etc.), location of the network components, and other characteristics common to a set of networks. For example, the secondary network cable 200a can connect a single or multiple networks of a first security classification to the service cable box 100b. Comparably, the secondary network cable 200b can connect one or more networks of a second security classification to service cable box 100b.

In one or more implementations, the service cable box 100b has a barrier plate 140b that can cover the first secondary connection chamber 110e and second secondary connection chamber 110f. Particularly, at least a portion of the barrier plate 140b can cover and protect the secondary network cables 200a (located in the first secondary connection chamber 110e) from unauthorized access. Similarly, another portion of the barrier plate 140b can cover and protect the secondary network cables 200b (located in the second secondary connection chamber 110f) from unauthorized access.

For additional security and/or separation of the secondary network cables 200a, 200b, the housing 120b of the service cable box 100b can have corresponding dedicated entry ports 310a, 310b. Each of the entry ports 310a, 310b can allow entry of the secondary network cables 200a, 200b (respectively) to one specific chamber. In particular, the entry port 310a can allow the secondary network cables 200a to enter the first secondary connection chamber 110e. Similarly, the entry port 310b can allow the secondary network cables 200b to enter the first secondary connection chamber 110f.

Thus, the secondary network cables 200a, 200b that enter the service cable box 100b can be segregated and secured based on type and/or security classification. In one implementation, the service cable box 100b can include secure dedicated entry ports (e.g., entry ports 310a, 310b) that connect to a secure secondary connection chamber, as well as non-secure dedicated entry ports that connect to non-secure secondary connection chambers. In other words, as described above and further described below, a secure chamber can have restricted access thereto, which may depend on the user's security clearance. In one example implementation, every secondary connection chamber can be a secure connection chamber (which can include different levels of security classifications, e.g., Secret and Top Secret). In an alternative implementation, one or more secondary connection chambers are secure chambers, while the remaining secondary connection cambers are non-secure.

The housing 120b can include both the non-secure and the secure dedicated entry ports 310a, 310b (as the case may be), such that each secondary network cable or sets of cables can enter on the same side of the housing 120b. In alternative implementations, the various entry ports 310a, 310b can be positioned on various sides of the housing 120b providing the service box service cable box 100 with the ability to accept cables from various directions without having to bend or twist the cables.

Position of the entry ports 310a, 310b also can provide additional physical security functions. In particular, locations and/or positions of the entry ports 310a, 310b on the housing 120b can be configured such that the entry ports 310a and/or 310b only can be accessed if the service box service cable box 100b is removed from the mounting location within the ceiling, floor, or wall. As noted above, for additional security, mounting screws and/or other mounting components, secure the service cable box 100b to a support structure in the wall from within the connection chambers. Thus, an unauthorized user may not be able to remove the service cable box 100b from the wall (for instance, to access the entry ports 310a, 310b), since the user may have to access the secured connection chambers, which may require a key (as described above).

To restrict access to the secondary connection chambers (e.g., to the first and second secondary connection chambers 110e, 110f), the service cable box 100b includes a barrier plate 140b. Similar to the barrier plate 140, 140a, as described above in connection with FIGS. 1A-1B, the barrier plate 140b can permanently or semi-permanently couple to the housing 120b. In other words, the barrier plate 140b may be immovably coupled to the housing 120b. Alternatively, similar to the barrier plate 140a (FIG. 1C), the barrier plate 140b can include a hinge assembly that can allow the barrier plate 140b to swing into open and closed positions (providing and blocking access to the connection chambers).

Additionally, in at least one implementation, the barrier plate 140b can include two openings (i.e., openings 142b, 142c) that can provide access through the barrier plate 140b into the first service connection chamber 110c and second service connection chamber 110d, respectively. In other words, the user can access each of the first and second service connection chambers 110c, 110d through an individual opening that corresponds with the particular service connection chamber. In one or more other implementations, however, the service cable box 100b can include the barrier plate 140b with a single opening that can provide access to both the first and the second connection chambers 110c, 110d.

In one or more implementations, the service cable box 100b also has two doors 150b, 150c, which can cover the openings 142b, 142c, respectively. The doors 150b, 150c can fit into the housing slots 230e, 230f, in a similar manner as described above in connection with FIG. 1A-1C. Particularly, the housing slots can couple to the housing 120 (see housing

230a, 230b, FIG. 1B), and, therefore, the doors 150b, 150c also can be secured to the housing 120, directly through the housing slots. Alternatively, the housing slots can couple to the barrier plate 140b, similar to the door slots 232c, 232d (see FIG. 1C). Thus, the doors 150b, 150c can couple to the barrier plate 140b, and the barrier plate 140b can couple to the housing 120. Furthermore, the doors 150b, 150c can have substantially the same configuration as the door 150 (FIG. 1B).

As described above, the doors 150b, 150c can slide along the housing slots into an open or closed position. In the closed position, the door 150b prevents access to the first service connection chamber 110c. Similarly, in the closed position, the door 150c prevents access to the second service connection chamber 110d. Conversely, when the doors 150b, 150c are in the open position, the user can access the first and second service connection chambers 110c, 110d.

The service cable box 100b also can include locks 160a, 160b, which can respectively lock the doors 150b, 150c in the closed positions. The locks 160a, 160b also may require different keys (e.g., physical keys) for opening and closing thereof. Accordingly, the service cable box 100b can selectively restrict access to network connectors contained within the service cable box 100b.

As noted above, the first service connection chamber 110c and the second service connection chamber 110d can provide network connectors connected to networks or network sets having different characteristics, such as security classifications. Accordingly, a first lock (e.g., lock 160a) can restrict access to the first service connection chamber 110c, which can house service connections to network(s) having the first security classification. Similarly, a second lock (e.g., lock 160b) can restrict access to the second service connection chamber 110d, which can house service connections to network(s) having the second security classification. Accordingly, for example, a network administrator can provide the keys (i.e., access) to selected users, who are authorized to access the respective service connection to the first and/or second security classification networks.

Hence, the service cable box 100b can provide restricted and secure access to two networks or sets of networks housed within the service cable box 100b. In light of this disclosure, however, it should be apparent to those skilled in the art that this invention is not so limited. Particularly, in at least one implementation, the service cable box can have any number of secondary and corresponding service connection chambers, which can house network cables of any number of security classifications. For example, the service cable box can include three or more service connection chambers, which the user can access through corresponding one or more openings in the barrier plate. Similarly, the service cable box also can include three or more doors that can cover the opening(s) in the barrier plate, and which can selectively provide access to respective service connection chambers.

In one or more implementations, the service cable box 100b also can include a face plate 170b that can conceal edges of the opening in the wall that accepts the housing 120. The face plate 170b can provide an aesthetically pleasing appearance to the service cable box 100b. Additionally or alternatively, the barrier plate 140b can extend past the housing 120 and can cover the edges of the opening in the wall, which accepts the housing 120 of the service cable box 100b.

Figure 3B:
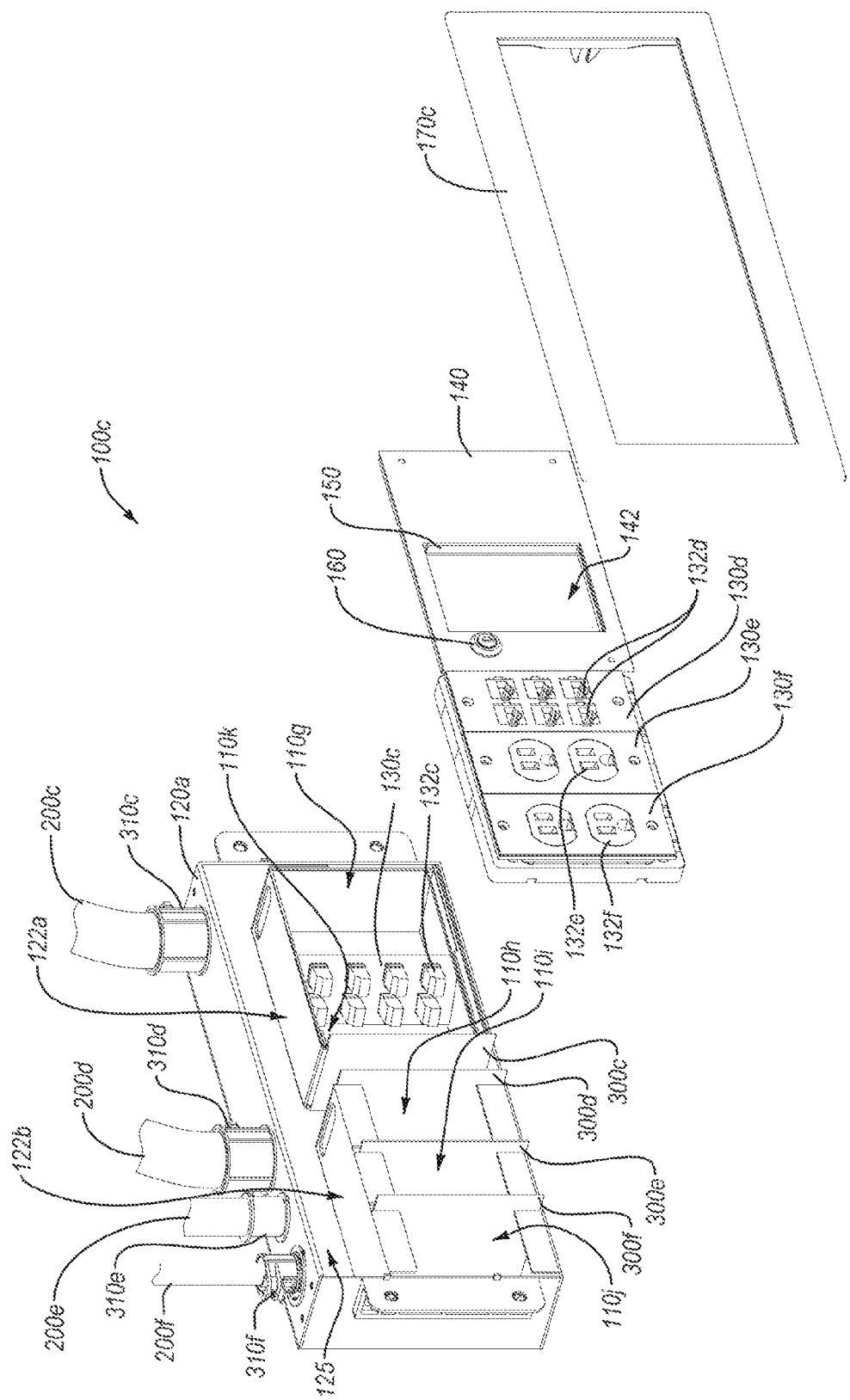
FIG. 3B illustrates an exploded perspective view of the service cable box of FIG. 3A.

As alluded to above, in still other implementations, the service cable box can provide access to service connections unprotected by the door (or by a lock). Moreover, the service cable box can house networks of different types, such as communication network and electrical network. For example, as illustrated in FIGS. 3A-3B, a service cable box 100c can have multiple connection chambers that can house network cables of different types and security classifications.

In particular, the service cable box 100c has entry ports 310c, 310d that accept secondary network cables 200c, 200d from data and/or telecommunication networks. Furthermore, the secondary network cable 200c, 200d can have different security classifications. For instance, the secondary network cable 200c can have a first security classification (e.g., top secret) and the secondary network cable 200d can have a second security classification, unclassified. Accordingly, the service cable box 100c includes secure and unsecure connection chambers (described below), which can accept the respective secondary network cables 200c, 200d.

Additionally, the service cable box 100c has entry ports that accept secondary network cables from an electrical network. Particularly, the service cable box 100c has entry ports 310e, 310f that can respectively accept secondary network cables 200e, 200f from respective first and second electrical networks. In one or more implementations, the first and second electrical networks can have different voltage (e.g., the first electrical network can have 110V and the second electrical network can have 220V). Alternatively, the first and second electrical networks can have different phases. In still further implementations, the secondary network cables 200e, 200f are both feed from the same electrical network or power grid.

In at least one implementation, the service cable box 100c includes a housing 120a that houses various secure and unsecure connection chambers (including primary and secondary connection chambers). More specifically, the housing 120a of the service cable box 100c includes secondary connection chambers 110g, 110h, 110i, 110j, as shown in FIG. 3B. The secondary connection chambers 110g, 110h accept and secure data/communication secondary network cables 200c, 200d, respectively. The secondary connection chambers 110i, 110j accept and secure respective electrical secondary network cables 200e, 200f. The secondary network cables 200c, 200d, 200e, 200f, secured within respective secondary connection chambers 110g, 110h, 110i, 110j, can further connect to respective connector modules 130c, 130d, 130e, 130f.

Additionally, the service cable box 100c has a service connection chamber 110k, which can be a secure connection chamber. In particular, the connector module 130c can separate the secondary connection chamber 110g from the service connection chamber 110k. Furthermore, the connector module 130c can include service network connectors 132c. Notably, the secondary connection chamber 110g, service connection chamber 110k and the connector module 130c can have substantially the same configuration as the service connection chamber 110a, secondary connection chamber 110b, and the connector module 130 described above (see FIG. 1B).

In at least one implementation, the service cable box 100c includes the barrier plate 140 that covers and/or seals the secondary connection chamber 110g. The barrier plate 140 also has the opening 142, which provides access to the service connection chamber 110k and, consequently, to the connector module 130c. As described above, in one or more implementations, the service connection chamber 110k and/or the secondary connection chamber 110g can be secure chambers. Thus, the barrier plate 140 can securely couple to the housing 120, such that an unauthorized user may not gain access to the secondary connection chamber 110g. Additionally, similar to the other service boxes described above, the service cable box 110c can include a Furthermore, the service cable box 100c can include the door 150, which can restrict access to the service connection chamber 110k (i.e., making the service connection chamber 110k a secure chamber). Particularly, as described above, the door 150 can slide into the closed position, where the user or the network administrator can lock the door 150 with the lock 160, thereby restricting access to the service connection chamber. Authorized personnel (users that have the key to the lock 160) can slide the door 150 into the open position, thereby accessing the service connection chamber 110k through the opening 142.

As described above, the service cable box 100c can include additional chambers, which may be unsecure. Such additional chambers may be separated one from another by barriers. For instance, the secondary connection chamber 110h (which is unsecure) may be separated from the secure service connection chamber 110k by barriers 300c, 300d. Multiple barriers that separate one connection chamber from another can provide additional security by further blocking access from one connection chamber into another. Similarly, secondary connection chambers 110h, 100i, 110j are separated one from another by barriers 300e, 300f.

In one or more implementations, the service cable box 100c can include sub-housings 122a, 122b. Such sub-housings 122a, 122b can provide further separation and security to network cables and network connectors located therein. For instance, the sub-housing 122a can form the secondary connection chamber 110g and the service connection chamber 110k, while the sub-housing 122b can form the remaining secondary connection chambers 110h, 110i, 110j. Thus, respective sidewalls of the sub-housings 122a, 122b also can form the barriers 300c, 300d, which separate the service connection chamber 110k from the secondary connection chamber 110h.

Furthermore, the sub-housing 122a can be separated one from another, which also can form separated barriers 300c, 300d, described above. Such separation can provide additional security to secure connection chambers and may reduce or eliminate electromagnetic field interference. Similarly, the sub-housings 122a, 122b can have a separation from the housing 120a, forming a space 125. For instance, the space 125 can house network cables.

In at least one implementation, the secondary network cables 200d can connect an unsecure network to a connector module 130d. Connector module 130d can comprise multiple network connectors 132d that can accept data/communications service network cables or cable connectors or jacks (e.g., network connectors 132 can be data network outlets). Moreover, the connector module 130d can have a substantially parallel orientation with the wall when the service cable box 100c is installed.

Additionally or alternatively, the service cable box 100c can include electrical secondary network cables 200e, 200f that connect to connector modules 130e, 130f, respectively. Connector modules 130e, 130f include respective network connectors 132e, 132f (i.e., power outlets that can accept electrical plugs). Such network connectors 132e, 132f can have a desired configuration, for example, based on the voltage of the electrical secondary network cables 200e, 200f.

Figure 4B:
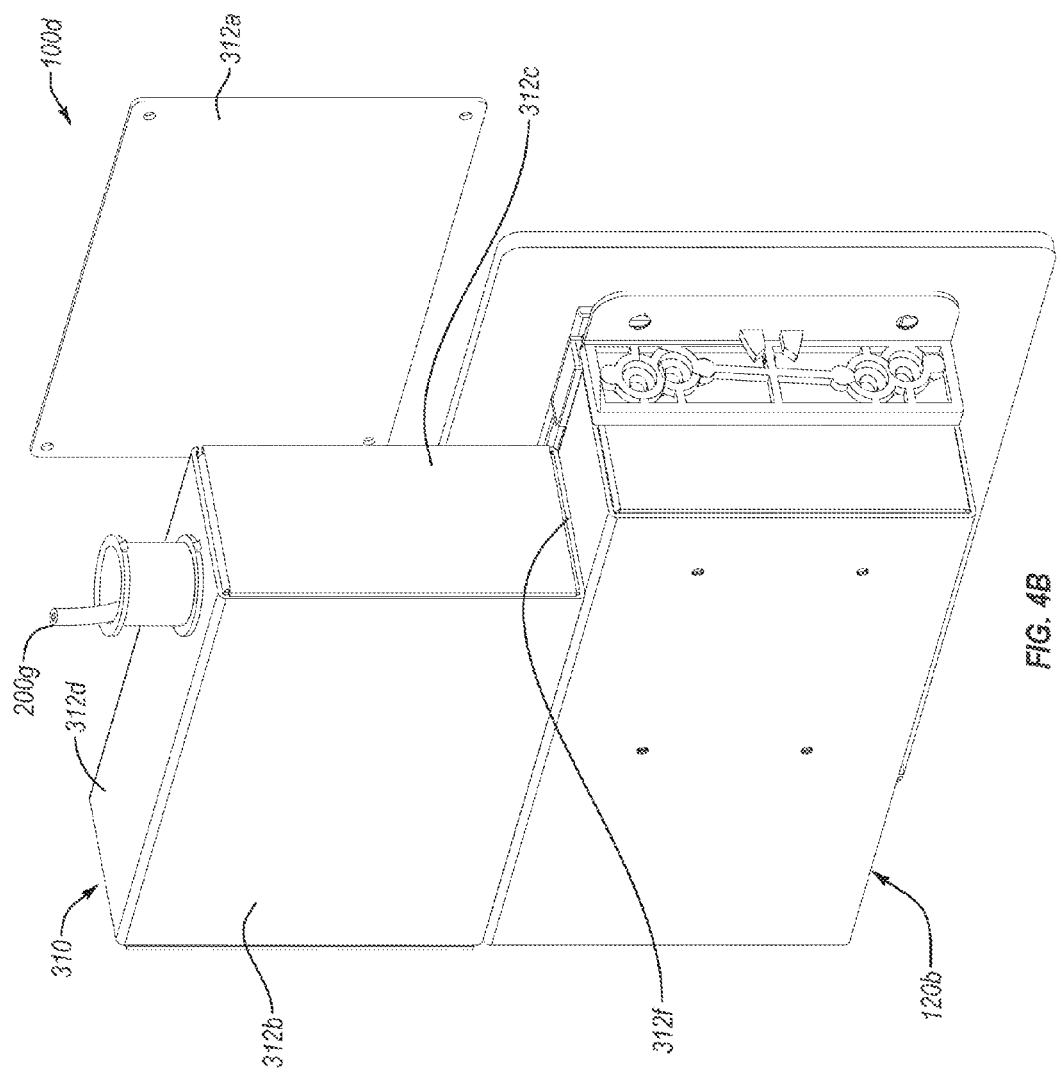
FIG. 4B illustrates a back perspective view of the service cable box of FIG. 4A.

In at least one implementation, the service cable box can accept secondary network cables that may have a minimum radius requirement—i.e., secondary network cables that may break or malfunction if bent beyond a certain minimum radius. To accommodate such secondary network cables (e.g., fiber optic cables) the service cable box can include an additional enclosure. For instance, as illustrated in FIGS. 4A-4B, a service cable box 100d can include an expander box 310 connected to a housing 120b.

The expander box 310 can have any suitable shape that can accommodate a minimum radius looping of a secondary network cable 200g. For example, the expander box 310 can have a substantially rectangular configuration, with front and back plates 312a, 312b and four sidewalls 312c, 312d, 312e, 312f. The sidewall 312d can include an entry port 310g, which can accept the secondary network cable 200g. The sidewall 312f can have an exit port that can allow the secondary network cable 200e to pass into the housing 120b (and more specifically into the secondary connection chamber within the housing 120b).

In one or more implementations, the installer can remove the front plate 312a to access the interior space of the expander box 310. Hence, the installer can route the secondary network cable 200g into a loop 202g (having at least a minimum radius) by winding the secondary network cable 200g onto pegs (such as pegs 320a, 320b, 320c, 320d). The installer can form a single loop 202g or multiple loops of similar radius. Although, the illustrated implementations of the service cable box 100d includes four pegs 320a, 320b, 320c, 320d, this invention is not so limited. Hence, the expander box 310 can include fewer or more pegs, about which the installer can wind the secondary network cable 200g.

After winding the secondary network cable 200g onto the pegs 320a-320c, the installer can secure the front plate 312a. For instance, the installer can use fasteners to fasten the front plate 312a to one or more sidewalls 312c-312f, or portions thereof. Additionally or alternatively, the installer can weld, solder, or press fit the front plate to or within one or more of the sidewalls 312c-312e.

After securing the secondary network cable within the expander box 310, the installer can complete installation of the service cable box 100c within the wall, as described above. In light of this disclosure, those skilled in the art should appreciate that expander box 310 can mount on any housing 120 of any of the implementations of the service cable box 100, 100a, 100b (FIGS. 1A-3B). Furthermore, the expander box 310 can provide expansion of secondary network cables that may enter secure or unsecure chambers of the service cable box.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A recessed service cable box for securing a plurality of network cables and for providing access to a plurality of securable network connections based at least in part on security clearance to access a particular security classification network, the service cable box comprising:
a housing;
a first connection chamber located within the housing;
a second connection chamber located within the housing;
a connector module separating the first connection chamber from the first second connection chamber;
a barrier plate coupled to the housing, the barrier plate having an opening, and the barrier plate being sized and configured to at least partially cover the first connection chamber and to prevent access thereto;
a door coupled to one or more of the housing and the barrier plate, the door being configured to slide open and further configured to selectively provide access to the second connection chamber through the opening in the front barrier plate; and a lock configured to selectively lock the door relative to the barrier plate.

2. The service cable box as recited in claim 1, wherein:
the first connection chamber is configured to secure service network cables of a first network having a first security classification; and
the second connection chamber is configured to secure secondary network cables having the first security classification.

3. The service cable box as recited in claim 2, further comprising:
a third connection chamber that is a second service connection chamber configured to secure service network cables of a second network having a second security classification; and
a fourth connection chamber that is a second secondary connection chamber configured to secure service network cables having the second security classification.

4. The service cable box as recited in claim 2, further comprising:
a third connection chamber configured to secure secondary network cables of a second network; and
a second connector module covering the third connection chamber.

5. The service cable box as recited in claim 4, wherein:
the first network is a data or communication network;
the second network is an electrical network; and
the second connector module contains power outlets.

6. The service cable box as recited in claim 1, wherein the front barrier plate is fixedly coupled to the housing.

7. The service cable box as recited in claim 1, wherein the front barrier plate is rotatably coupled to the housing.

8. The service cable box as recited in claim 7, further comprising a locking slot coupled to the front barrier plate, the locking slot being configured to accept a portion of the door and prevent the barrier plate from rotating with respect to the housing.

9. A service cable box for housing a plurality of network cables and for accepting network cables to connect to one or more network connections while maintaining connections within the service cable box, the service cable box comprising:
a housing configured to be mounted within a wall;
a connection chamber disposed within the housing, the connection chamber being configured to physically secure secondary network cables;
a front barrier plate or a face plate coupled to the housing, the front barrier plate or the face plate having at least one opening, wherein the front barrier plate or the face plate is configured to extend substantially parallel to the wall;
a connector module located in the connection chamber;
a door coupled to one or more of the housing and the barrier plate or the face plate, the door being configured to slide open and selectively provide access to at least a portion of the connection chamber through the opening in the front barrier plate or the face plate;
a lock configured to selectively lock the door relative to the barrier plate or the face plate;
a first service connection chamber configured to secure service network cables of a first network having a first security classification; and
a first secondary connection chamber configured to secure secondary network cables having the first security classification, wherein the connector module separates the first service connection chamber from the first secondary connection chamber;
wherein:
one or more of the front barrier plate or the face plate is configured to abut the wall when the service cable box is installed;
the connector module has a non-parallel orientation with respect to one or more of the front barrier plate or the face plate; and
the connector module is configured to be recessed within the wall.

10. The service cable box as recited in claim 9, further comprising:
a third connection chamber that is a second service connection chamber configured to secure service network cables of a second network having a second security classification; and
a fourth connection chamber that is a second secondary connection chamber configured to secure service network cables having the second security classification.

11. The service cable box as recited in claim 9, further comprising:
a third connection chamber configured to secure secondary network cables of a second network; and
a second connector module covering the third connection chamber.

12. The service cable box as recited in claim 11, wherein:
the first network is a data or communication network;
the second network is an electrical network; and
the second connector module contains power outlets.

13. The service cable box as recited in claim 9, wherein the front barrier plate or the face plate is fixedly coupled to the housing.

14. The service cable box as recited in claim 9, wherein the front barrier plate or the face plate is rotatably coupled to the housing.

15. The service cable box as recited in claim 9, further comprising a locking slot coupled to the front barrier plate or the face plate, the locking slot being configured to accept at least a portion of the door, thereby preventing the front barrier plate or the face plate from rotating with respect to the housing.

16. A secure network cable distribution system for securing network cables from networks of different types or security classifications, the system comprising:
one or more data or communication secondary network cables located in an interior space of one or more of a ceiling, a floor, or a wall;
an electrical secondary network cable located in the interior space of one or more of the ceiling, the floor, or the wall; and
a service cable box mounted within the interior space of one or more of the ceiling, the floor, or the wall; wherein the service cable box includes a plurality of connection chambers within a unitary housing, the plurality of connection chambers accepting and securing the one or more data or communication secondary network cables, and the electrical secondary network cable; and
a barrier plate configured to selectively restrict access to the plurality of connection chambers; and
one or more lockable doors in the service cable box, the one or more lockable doors configured to open or close a corresponding opening of the barrier plate, and to selectively seal one or more connection chambers of the plurality of connection chambers within the service cable box.

17. The system as recited in claim 16, wherein one or more data or communications secondary network cables have a first security classification.

18. The system as recited in claim 17, further comprising one or more network connectors connected to the one or more data or communications secondary network cable of the first security classification, wherein the one or more lockable doors seals the one or more network connectors within the one or more connection chambers.

19. The system as recited in claim 18, wherein one or both of the unitary housing and the barrier plate further comprises a locking slot for selectively securing the barrier plate to the unitary housing with a lockable door that slides with respect to the barrier plate.

20. A service cable box for housing a plurality of network cables and for accepting network cables to connect to one or more network connections while maintaining connections within the service cable box, the service cable box comprising:
  a housing configured to be mounted within a wall;
  a connection chamber disposed within the housing, the connection chamber being configured to physically secure secondary network cables;
  a front barrier plate coupled to the housing, the front barrier plate having at least one opening, wherein the front barrier plate is configured to extend substantially parallel to the wall;
  a connector module located in the connection chamber; and
  a locking slot coupled to the front barrier plate, the locking slot being configured to accept at least a portion of a door, thereby preventing the barrier plate from rotating with respect to the housing;
  wherein:
  one or more of the front barrier plate or a face plate is configured to abut the wall when the service cable box is installed;
  the connector module has a non-parallel orientation with respect to one or more of the front barrier plate or the face plate;
  the connector module is configured to be recessed within the wall; and
  the front barrier plate is rotatably coupled to the housing.

21. The service cable box as recited in claim 20, further comprising:
  a door coupled to one or more of the housing and the barrier plate, the door being configured to slide open and selectively provide access to at least a portion of the connection chamber through the opening in the front barrier plate; and
  a lock configured to selectively lock the door relative to the barrier plate.

22. The service cable box as recited in claim 21, wherein the connection chamber comprises:
  a first service connection chamber configured to secure service network cables of a first network having a first security classification; and
  a first secondary connection chamber configured to secure secondary network cables having the first security classification, wherein the connector module separates the first service connection chamber from the first secondary connection chamber.

23. The service cable box as recited in claim 22, further comprising:
  a third connection chamber that is a second service connection chamber configured to secure service network cables of a second network having a second security classification; and
  a fourth connection chamber that is a second secondary connection chamber configured to secure service network cables having the second security classification.

24. The service cable box as recited in claim 22, further comprising:
  a third connection chamber configured to secure secondary network cables of a second network; and
  a second connector module covering the third connection chamber.

25. The service cable box as recited in claim 24, wherein:
the first network is a data or communication network;
the second network is an electrical network; and
the second connector module contains power outlets.

* * * * *